United States Patent [19]

Ito et al.

[11] Patent Number: 5,119,124
[45] Date of Patent: Jun. 2, 1992

[54] CAMERA WITH FINDER OF CLEAR DISPLAY

[75] Inventors: Kenji Ito; Shingo Hayakawa; Shoji Kaihara, all of Kanagawa, Japan

[73] Assignee: Canon Kabushiki Kaisha, Tokyo, Japan

[21] Appl. No.: 641,712

[22] Filed: Jan. 15, 1991

[30] Foreign Application Priority Data

| Jan. 23, 1990 | [JP] | Japan | 2-4859 |
| Jan. 23, 1990 | [JP] | Japan | 2-4860 |
| Jan. 23, 1990 | [JP] | Japan | 2-4861 |
| Jan. 25, 1990 | [JP] | Japan | 2-6409 |

[51] Int. Cl.⁵ .................................. G03B 17/18
[52] U.S. Cl. ............................. 354/409; 354/466
[58] Field of Search ............. 354/409, 466, 471, 472, 354/474, 473, 475, 199-201, 224, 225, 165, 166

[56] References Cited

U.S. PATENT DOCUMENTS

| 4,231,649 | 11/1980 | Kimura et al. | 354/224 |
| 4,367,463 | 1/1983 | Suzuki et al. | 354/409 X |
| 4,374,612 | 2/1983 | Matsumura et al. | 354/466 |
| 4,557,578 | 12/1985 | Seely | 354/409 X |
| 4,662,716 | 5/1987 | Matsumura et al. | 350/169 |
| 4,711,547 | 12/1987 | Iizuka | 354/471 |
| 5,053,803 | 10/1991 | Suda et al. | 354/466 |

FOREIGN PATENT DOCUMENTS 56-99332 8/1981 Japan.
62-41311 10/1987 Japan.

Primary Examiner—W. B. Perkey
Attorney, Agent, or Firm—Fitzpatrick, Cella, Harper & Scinto

[57] ABSTRACT

A camera including: and an objective lens, a finder for observing an object image, an array of minute prisms for presenting a display of characters in a viewing area of the finder, a light source for illuminating the minute prisms, a reflector for directing a light beam from the light source to the minute prisms, and a provision for absorbing undesirable light arranged on the side portion of the finder to absorb that part of the light which has passed through the prisms which would otherwise be refracted in a predetermined direction by the minute prisms.

8 Claims, 4 Drawing Sheets

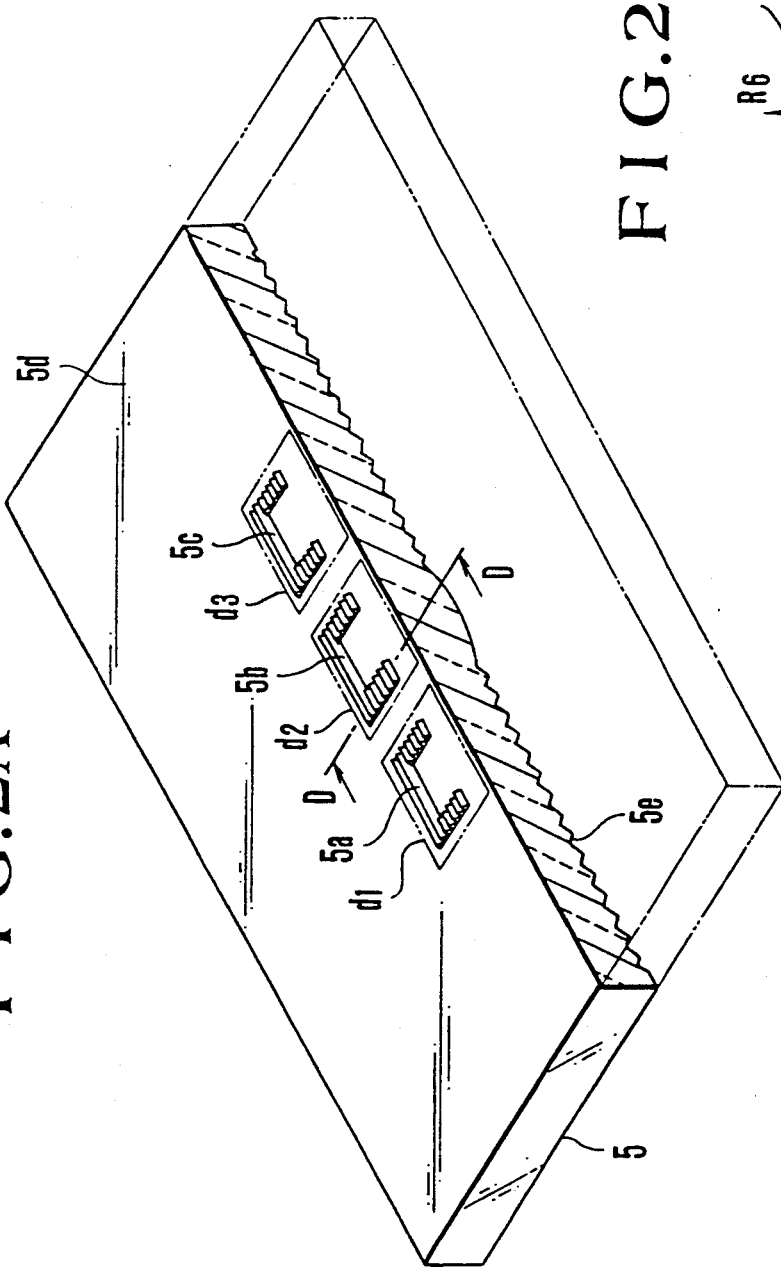
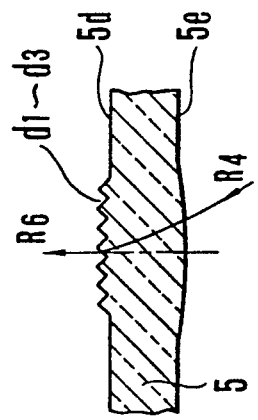

CAMERA WITH FINDER OF CLEAR DISPLAY

BACKGROUND OF THE INVENTION

1. Field of the Invention

This invention relates to cameras having an information mark display device and, more particularly, to the finder display of camera in which undesirable light is removed.

2. Description of the Related Art

In this kind of device, many methods have been proposed. For example, LEDs or like display elements are put in a portion of the space surrounding the pentagonal roof type prism, and light issuing from them is brought by transmission to the finder viewing area (Japanese Utility Model Publication No. Sho 62-41311). In another method, a diffraction grating is formed on the focusing screen. The LEDs are positioned to face one side of the focusing screen so that light issuing from them is conducted by total reflection to the diffraction grating, by which it is bent to the finder viewing area (Japanese Laid-Open Patent Application No. Sho 56-99332). However, these are to present the display outside the field of observation.

Therefore, as the display is illuminated by the light emitting element disposed on the side of the pentagonal prism, the length of optical path has to be corrected at the outside of the pentagonal prism so that the distance from the display to the eye is equal to the distance from the focusing screen to the eye. This causes the layout to be complicated and its scale to greatly increase. A different example from those described above is shown in U.S. Pat. No. 4,662,716 where the display is made to be presented in superimposing relation on the scene image. But, this has a problem of dimming the display.

In addition, in U.S. patent application Ser. No. 480,671 filed on Feb. 15, 1990 which issued as U.S. Pat. No. 5,053,803 on Oct. 1, 1991 there is proposed a device for displaying an image of characters in the field of observation in such a way that the characters in the form of minute refractors positioned at or near a predetermined focal plane of the image forming lens are selectively illuminated by the light reflected from the main mirror.

SUMMARY OF THE INVENTION

An object of the invention is to reduce the flare produced in the image when a display is presented in the camera having the objective lens fixed or detachably mounted thereto.

In the '803 U.S. patent application Ser. No. 480,671, the display element is illuminated by an oblique light beam. In application to some cameras, it has been found that part of the light beam appears as flare in the image. This flare is caused by undesirable light in such a way that a portion of the illuminating light which has not been refracted by the display element is reflected in the finder optical path. In addition, other undesirable light in an amount less than the above-described undesirable light is caused by a bundle of rays which passes through the reflector for directing the illuminating light to the display element and, after reflection from the support receptor for the reflector, returns back. FIG. 5 depicts this phenomenon, and its effect will be described later.

BRIEF DESCRIPTION OF THE DRAWINGS

FIG. 2A is a perspective view as viewed from the upper side of constituent parts of the embodiment.

FIG. 2B is a cross-sectional view taken along the D—D line of FIG. 2A.

DETAILED DESCRIPTION OF THE PREFERRED EMBODIMENTS

Figure 1:
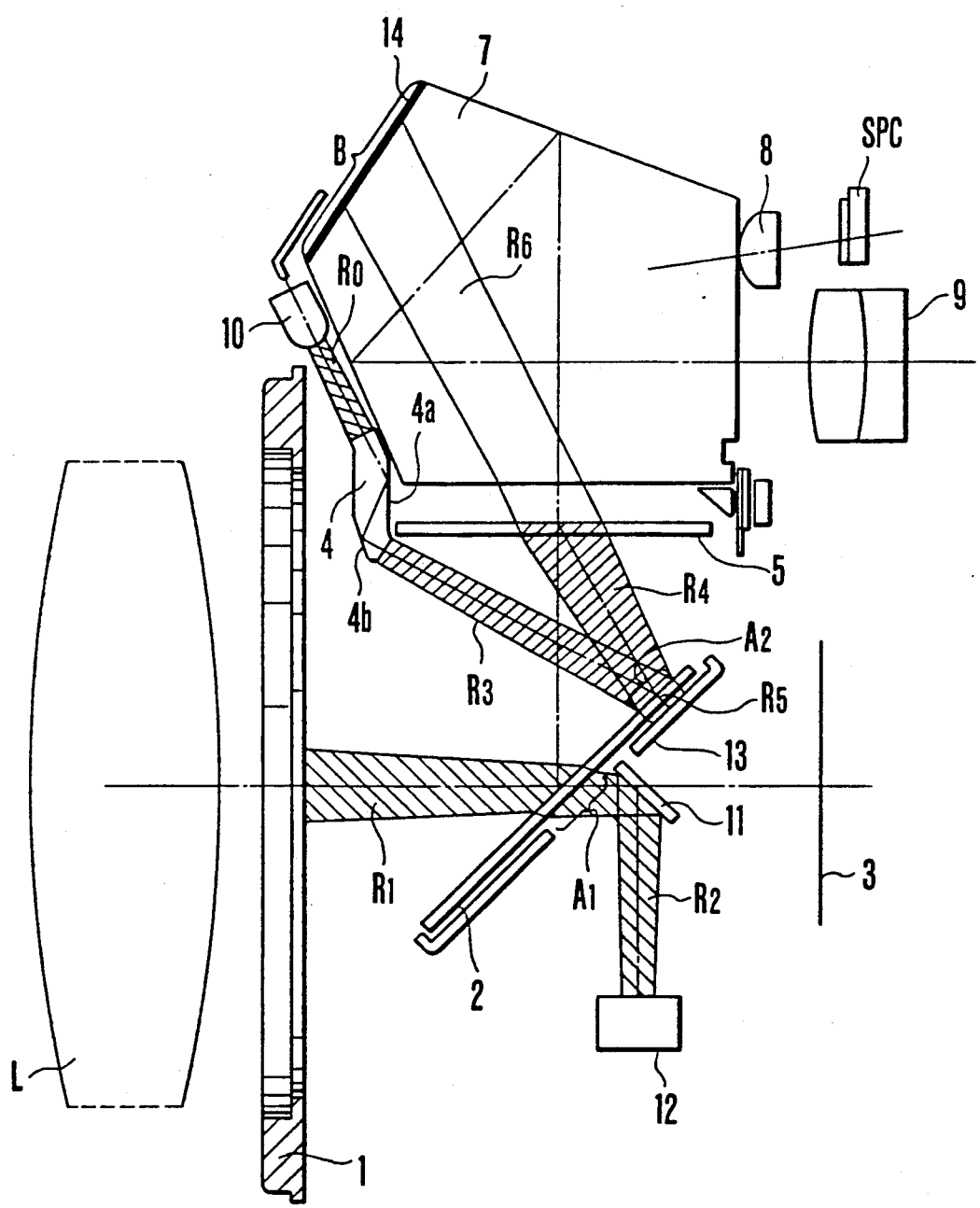
FIG. 1 is an optical sectional view of an embodiment according to the invention.

FIG. 1 shows a single-lens reflex camera employing one embodiment of the present invention. In the same figure, a lens mount 1 is used for attaching or detaching a photographic lens L to or from the camera body, but the photographic lens L may be fixedly secured thereto. A main mirror 2 is the so-called quick-return mirror disposed in front of a film plane 3. A plurality of prisms 4 are disposed in a row perpendicular to the drawing to conduct light from LEDs 10. A focusing screen 5, a roof type pentagonal prism 7, an image forming lens 8 for light measurement, a light sensor SPC and an eyepiece lens 9 are housed together with the parts 2 to 4 and 10 in a common casing of the camera body.

Light coming from an object to be photographed and entering through the photographic lens L is reflected from the main mirror 2 to form an image of the object on the focusing plane $5d$ (upper surface) of the focusing screen 5. The details of the focusing screen 5 will be described in connection with FIGS. 2A and 2B. In order to efficiently conduct the imaging light beam which is focused on the focusing plane $5d$ to an eye of the observer, the focusing screen 5 is provided with a Fresnel lens on the lower surface $5e$ thereof. With the help of this, the light beam diffused by the upper or mat surface of the focusing screen 5 is subjected to the reflecting actions of the roof type pentagonal prism 7 and then is enlarged by the eyepiece lens 9, reaching the observer's eye in the form of an erect non-reverse image.

The main mirror 2 is a half-transparency mirror having a reflectance of 60% over the entire area. The light emerging from the photographic lens L passes in a portion $R_1$ through a region $A_1$ of the main mirror 2 at 40%. The transmitted light beam $R_2$ is then reflected by a submirror 11 to photoelectric conversion means 12. In this instance, the photoelectric conversion means 12 is used for focus detection, constituting part of the known device for determining the degree of focus about a plurality of areas in the field of view separately from one another. The reflected 60% light from the main mirror 2 goes to the pentagonal prism 7. A light source for illumination, in this instance, comprises a plurality of LEDs 10 arranged in a row perpendicular to the drawing in correspondence to display marks to be described later. A light bundle $R_0$ issuing from the LED 10 enters the light conduction prism 4, then is reflected by surfaces $4a$ and $4b$ and then emerges as a light beam $R_3$ toward the main mirror 2 where it is reflected in a desired direction, becoming a light beam $R_4$ to be used for illuminating a respective region of the focusing screen 5.

The focusing screen 5 is of the form shown in FIG. 2A in perspective view as viewed from above and in FIG. 2B in sectional view in such a manner that the display elements and the ordinary focusing screen are made up as one unit. However, both may otherwise be made up in separately.

Display elements $d_1$ to $d_3$, though depicted in part, are rectangular frames which are formed of minute prism arrays $5a$, $5b$ and $5c$, respectively, and are positioned in correspondence to the respective focus detecting areas for the photoelectric conversion means 12. It is to be noted that the display may be assigned to the areas for weighted light measurement of the light sensor SPC. The display marks may be of different shape from that shown. Each prism of the minute prism arrays $5a$, $5b$ and $5c$ has its angle determined so as to refract the illuminating light beam R4 in the same direction as the finder observation light. The reflected illuminating light beam R4 when arriving at the focusing screen 5 illuminates the minute prism arrays $5a$, $5b$ and $5c$ disposed on the upper surface $5d$ of the focusing screen 5 shown in FIG. 2A. As shown in FIG. 2B, the light beam R4 is subjected to refraction by the minute prisms, and only a bundle $R_6$ of light rays which have passed through the minute prisms is collimated with the aforesaid object imaging light beam, so that they go to the observer's eye. Meanwhile, that part of the object image bearing beam which has passed through the minute prisms is refracted in a direction different from that to the observer's eye. Therefore, when the light sources 10 are not turned on, those portions of the image on the focusing screen 5 which are occupied by the minute prism arrays $5a$, $5b$ and $5c$ look dark. This is useful to let the observer recognize where the focus detecting areas lie. If one of the light sources 10 is turned on, the corresponding frame becomes bright, serving the observer to confirm which one of the focus detecting areas is particularly selected to operate.

Since the illuminating light beam R4, however, does not exclusively illuminate the minute prism rays $5a$, $5b$ and $5c$ alone, a bundle $R_6$ of light rays which pass through other than these portions directs itself to the front upper face B (the gable of the roof) and is reflected therefrom to migrate into the observation light beam, thus becoming a ghost or flare.

Accordingly, in this embodiment, the front upper face B of the pentagonal prism 7 is coated with a light absorbing black paint layer 14 to take up the light bundle $R_6$.

Therefore, even when the light source 10 is turned on, the observer can enjoy clear observation of the field of view and the display frame at a high quality despite illumination of the latter.

Figure 5:
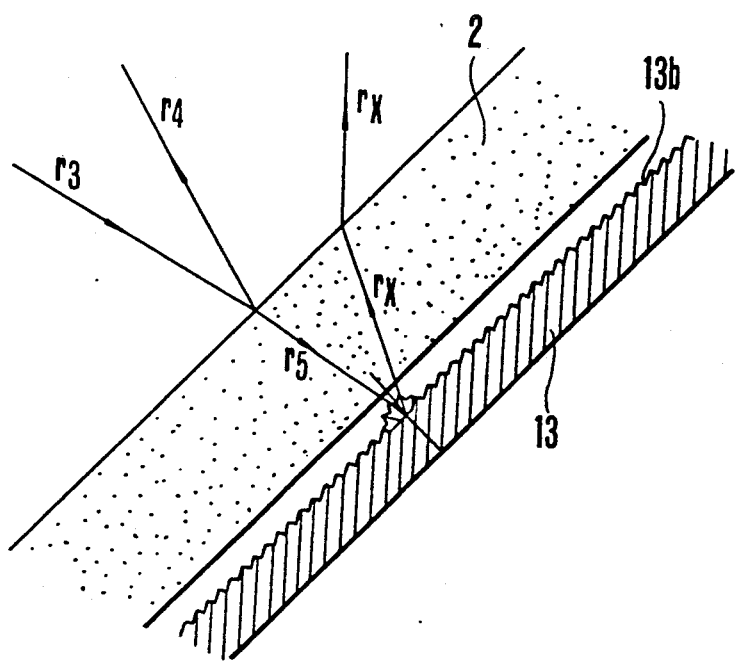
FIG. 5 is a diagram for explaining the problem of the conventional example.

Next, FIG. 5 is a sectional view in enlarged scale of an area $A_2$ of the main mirror 2 and a support member 13 for the main mirror 2 with the invention not yet applied thereto.

Part of the light beam $R_3$, i.e., a light ray $r_3$, is reflected 60% from the front surface of the main mirror 2. The reflected light $r_4$ goes to the minute prism arrays $5a$, $5b$ and $5c$ forming the display mark on the focusing screen 5.

The transmitted light ray $r_5$ past the front surface of the main mirror 2 reaches the front surface $13b$ of the main mirror support member 13. Since the front surface $13b$ of the main mirror support member 13 is a rough surface of the as-manufactured state, light impinging on the front surface $13b$ scatters, and some of the scattered light rays $r_x$ go to the finder on turning toward the eye of observer to become ghost or flare.

However, the ghost or flare caused by these light rays, because it is trifling, creates no problems in the cameras used by common people. Still, for professionals and high by skilled amateurs, improvements are desired.

For this purpose, a first method is to apply vacuum evaporation of metal to the area $A_2$ of the main mirror 2 so that the reflectance exceeds 60%. By employing this feature, the light that transmits the main mirror 2 decreases. Also, because the light returning from the front surface of the support member 13, too, becomes more difficult to transmit the main mirror 2, it is made possible to extremely reduce the undesirable light. Again, because the reflectance of the portion that the illuminating light strikes increases, the displayed character becomes brighter, providing an additional advantage of making it easier to see it.

Figure 3:
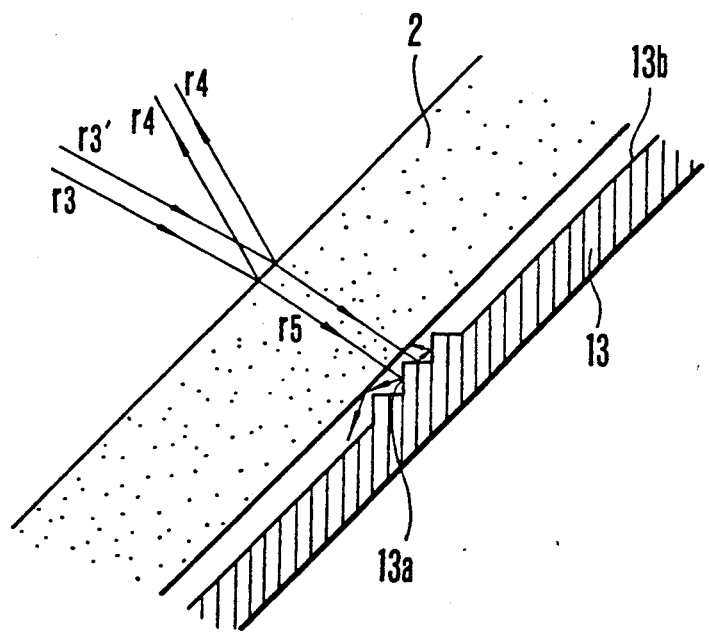
FIG. 3 is a fractional sectional view of another embodiment.

FIG. 3 shows another method of removing the undesirable light, being a sectional view in enlarged scale of the area $A_2$ and its neighborhood of the main mirror 2. Of the light rays $r_3$ of part of the light beam $R_3$, the ones which have passed through the main mirror 2, i.e., light rays $r_5$, reach the main mirror support member 13, where they are caused to stray by concave and convex stripes perpendicular to the drawing formed in a band area $13a$ of the front surface $13b$ of the member 13, so that they do not run in the direction to the eye of the observer.

Figure 4:
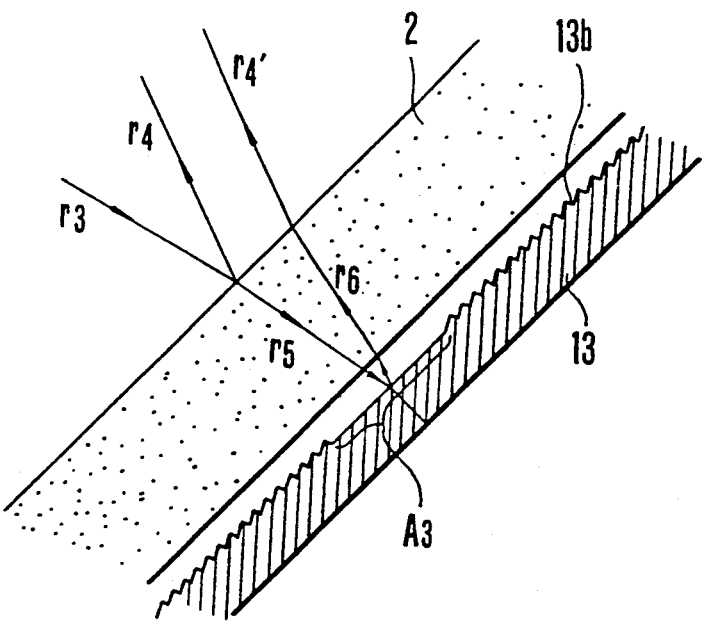
FIG. 4 is a fractional sectional view of a further embodiment

FIG. 4 is a partial sectional view in enlarged scale of the area $A_2$ and its neighborhood of the main mirror 2.

Part of the light beam R3, i.e., a light ray $r_3$, is reflected 60% from the surface of the main mirror 2. The reflected light ray $r_4$ goes to the minute prism arrays $5a$, $5b$ and $5c$ of the focusing screen 5. On the other hand, a light ray $r_5$ which has passed through the main mirror 2 is reflected from an area $A_3$ of the front surface $13b$ of the main mirror support member 13. Here, the area $A_3$ is formed by applying a polishing process, thus becoming like a mirror, or is subjected to metal deposition. Therefore, the light ray $r_5$ is reflected from the area $A_3$, becoming a light ray $r_6$, and passes through the interior of the mirror 2, becoming a light ray $r_4'$ parallel with the reflected light ray $r_4$, and goes to the focusing screen 5. The bundle $R_4$ of light rays going to the focusing screen 5 is refracted by the minute prism arrays $5a$, $5b$ and $5c$ arranged on the upper surface $5d$ of the focusing screen 5 in the direction to the eye of the observer. Thus, a bright display in superimposed relation on the aforesaid object image reaches the eye of the observer.

On the other hand, either this area $A_3$ of the main mirror support member 13 or the back surface of the main mirror 2 may be coated with a light absorbing paint layer.

What is claimed is:

1. A camera comprising:
   a finder for observing an object image formed by an objective lens;
   display means having an assembly of refractors for displaying characters in a viewing area of said finder;
   an illuminator for producing a light beam with which said refractors are illuminated;
   a reflector for directing the light beam from said illuminator to said assembly of refractors; and
   undesirable light absorbing means arranged on a side portion of said finder, for absorbing undesirable light which has passed through said display means without being refracted in a predetermined direction by said refractors.

2. A camera according to claim 1, wherein said finder has a roof type reflector, and wherein said absorbing means is provided in a gable face of said reflector.

3. A camera according to claim 1, further comprising focus detecting means for receiving part of a light beam emerging from said objective lens and for detecting a focus adjusting state of said objective lens with respect to a plurality of positions within a scene independently of one another, and wherein a plurality of said characters exist and are arranged in correspondence to said plurality of positions.

4. A camera according to claim 1, wherein said reflector is a half-transparency mirror, in which an area for reflecting said light beam for illumination is made to have a higher reflectance than the other area.

5. A camera comprising:
 a finder for observing an object image formed by an objective lens;
 a display member having an assembly of refractors for displaying a character in a viewing area of said finder;
 an illuminator for producing illuminating light;
 a reflector having a property of passing part of incident light therethrough to direct said illuminating light toward said assembly of refractors; and
 a support member for supporting said reflector and having its front surface formed so as to prevent a ghost from occurring as part of the transmitted illuminating light through said reflector is reflected from the front surface.

6. A camera according to claim 5, wherein the surface of said support member is made to be mirrored so that light ray reflected from said reflector and light rays which have passed through said reflector, then been reflected from said front surface and then passed through said reflector from the opposite direction become parallel to each other.

7. A camera according to claim 5, wherein the front surface of said support member is formed to effect reflecting so that light rays reflected from said front surface do not go to said reflector.

8. A camera according to claim 5, further comprising undesirable light absorbing means arranged on a side portion of said finder, for absorbing undesirable light which has passed through said display member without being refracted in a predetermined direction by said refractors.

* * * * *

UNITED STATES PATENT AND TRADEMARK OFFICE
CERTIFICATE OF CORRECTION

PATENT NO. : 5,119,124
DATED : June 2, 1992
INVENTOR(S) : Ito et al.

It is certified that error appears in the above-identified patent and that said Letters Patent is hereby corrected as shown below:

Title page, item:

[75] INVENTORS:

Line 14, "all of Kanagawa," should read --all of Yokohama,--

[57] ABSTRACT:

Line 1, "including:" should read --including--.

COLUMN 3:

Line 17, "beam R4" should read --beam $R_4$--;

Line 19, "beam R4" should read --beam $R_4$--; and

Line 40, "rays 5a, 5b" should read --arrays 5a, 5b--.

COLUMN 4:

Line 2, "observer" should read --the observer--; and "ghost" should read --a ghost--; and Line 32, "beam R3," should read --beam $R_3$,--

UNITED STATES PATENT AND TRADEMARK OFFICE
CERTIFICATE OF CORRECTION

PATENT NO. : 5,119,124

DATED : June 2, 1992

INVENTOR(S) : Ito et al.

It is certified that error appears in the above-identified patent and that said Letters Patent is hereby corrected as shown below:

<u>COLUMN 6</u>:

Line 11, "ray" should read --rays--; and

Line 14, "direction be" should read --direction, be--.

Signed and Sealed this

Seventeenth Day of August, 1993

Attest:

BRUCE LEHMAN

Attesting Officer

Commissioner of Patents and Trademarks